United States Patent [19]

Ishimaru et al.

[11] 3,946,317

[45] Mar. 23, 1976

[54] RADIO RECEIVER

[75] Inventors: Satoshi Ishimaru, Kashihara; Shoitsu Nakano, Kyoto, both of Japan

[73] Assignee: Matsushita Electric Industrial Company, Ltd., Osaka, Japan

[22] Filed: Aug. 6, 1974

[21] Appl. No.: 495,201

[30] Foreign Application Priority Data

| Aug. 9, 1973 | Japan | 48-94311[U] |
| Aug. 15, 1973 | Japan | 48-96202[U] |
| Oct. 4, 1973 | Japan | 48-116601[U] |
| Oct. 4, 1973 | Japan | 48-116602[U] |
| Oct. 11, 1973 | Japan | 48-118659[U] |
| Oct. 11, 1973 | Japan | 48-118660[U] |
| Nov. 7, 1973 | Japan | 48-129156[U] |
| Nov. 8, 1973 | Japan | 48-129632[U] |

[52] U.S. Cl. ............... 325/354; 325/361; 343/702
[51] Int. Cl.² ........................................... H04B 1/08
[58] Field of Search .......... 325/352, 354, 361, 365, 325/16, 310; 343/702

[56] References Cited
UNITED STATES PATENTS

| 2,930,038 | 3/1960 | Hoellerich | 343/702 |
| 3,164,833 | 1/1965 | Held | 343/115 |

*Primary Examiner*—Robert L. Griffin
*Assistant Examiner*—Marc E. Bookbinder
*Attorney, Agent, or Firm*—Stevens, Davis, Miller & Mosher

[57] ABSTRACT

A radio receiver has an antenna casing provided separately of the chassis and printed circuit board of the receiver and housing a rod-like antenna. The antenna casing has a stem portion rotatably and slidably extending through a bearing portion formed in the cabinet of the receiver to mount the antenna casing rotatably on the cabinet whereby the antenna may be oriented in a direction at which a desired radio wave is received best regardless of the orientation of the receiver relative to the radio wave.

8 Claims, 20 Drawing Figures

RADIO RECEIVER

The present invention relates to a radio receiver and, more particularly, to a portable type radio receiver.

In a portable type radio receiver, a rod-like antenna such as a ferite antenna has conventionally been disposed within the cabinet of the receiver and secured either to the chassis of the receiver or to the printed circuit board thereof. With this type of radio receiver, therefore, the sensitivity of the receiver to a desired radio wave depends solely upon the orientation of the receiver and hence the antenna disposed therein.

The present invention aims to solve the problem discussed and provide a radio receiver which is operative to catch a desired wave best regardless of the orientation of the body of the receiver relative to the desired radio wave.

According to the present invention, there is provided a radio receiver comprising a cabinet forming the body of the receiver, a chassis and a board disposed within said body, said board carrying thereon printed circuits and electric components forming radio receiving circuits, and a rod-like antenna electrically connected to said radio receiving circuits, a casing provided separately of said chassis and said board and housing said antenna therein, said cabinet having a bearing portion formed therein, said antenna casing having a stem portion received in said bearing portion so that said antenna casing is rotatable with respect to said cabinet.

The present invention will now be described by way of example with reference to the accompanying drawings showing embodiments of the invention.

Figure 3:
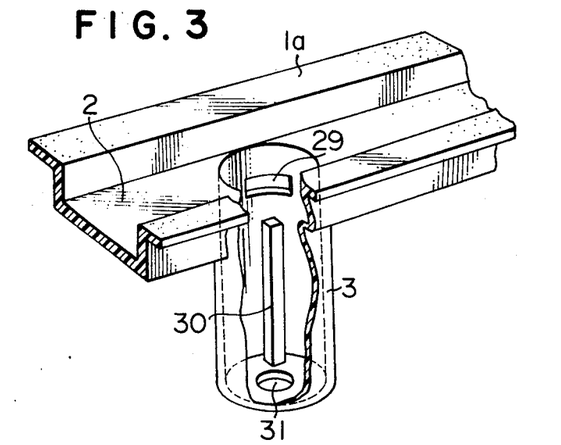
FIG. 3 is a fragmentary perspective view illustrating the bearing portion with a part being cut away.
Figures 4, 5:
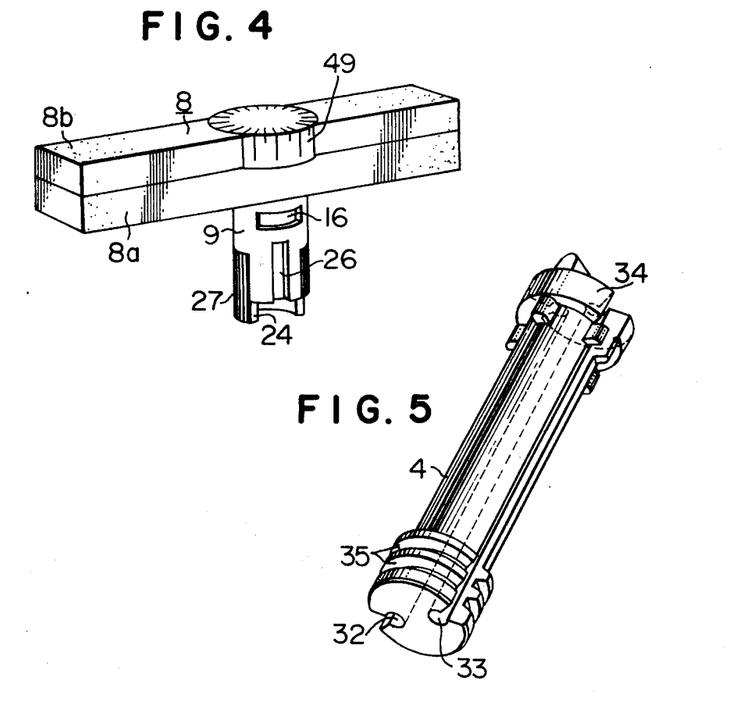
FIG. 4 is a perspective view of an antenna casing of the radio receiver.
FIG. 5 is a perspective view of a shaft for rotatably supporting the antenna casing on the cabinet.
Figure 6:
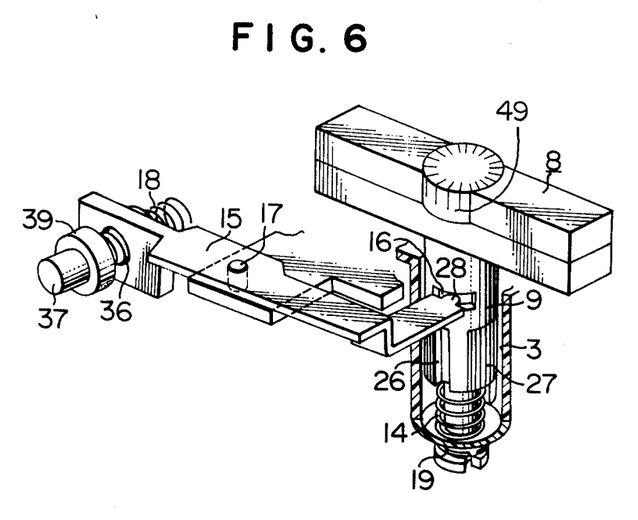
FIG. 6 is a perspective view illustrating a stem portion of the antenna casing and an associated operating lever.

Referring to FIGS. 1 to 13 of the drawings, the radio receiver has a cabinet 1 which forms the body of the receiver. The cabinet 1 carries tuning and volume controller knobs 21 and 22 mounted on one side face of the cabinet, while a dial 23 is provided on the front face of the cabinet. The cabinet 1 comprises a cabinet body 1a and a cabinet lid 1b fitted thereto. An elongated recess 2 is formed in the top of the cabinet 1. The cabinet is provided with a tubular bearing portion 3 defining therein a cylindrical space which is in communication with the recess 2, as will be best seen in FIG. 3. The bearing portion 3 is formed with a slot 29 in the peripheral wall, with an axially elongated ridge 30 on the inner peripheral surface and with a through-hole 31 in the bottom wall. An axle or shaft 4 is secured to the through-hole 31 by a fastener 19 and extends through the interior of the bearing portion 3. As best shown in FIG. 5, the shaft 4 has a pair of axial grooves 32 and 33 formed in the peripheral surface of the shaft, a flange 34 formed at one end thereof and annular grooves 35 formed in the other end of the shaft 4.

The receiver also has a board 5 carrying printed circuits (not shown) and electrical components one of which is indicated by 7, said components constituting radio receiving circuits.

Figure 2:
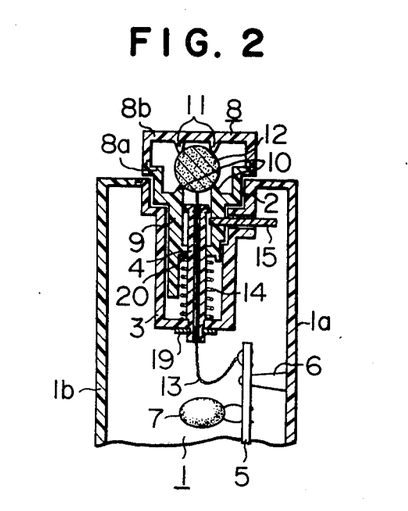
FIG. 2 is a sectional view of the receiver taken in a plane extending through a bearing portion of a cabinet of the receiver.

An antenna casing 8 is formed by a casing parts 8a and 8b having spaced longitudinal ribs 10 and 11, respectively, which cooperate together to hold within the casing 8 a rod-like antenna which may preferably be a ferrite antenna 12. The antenna casing 8 has a tubular hollow stem portion 9 extending therefrom substantially at right angles, as best shown in FIG. 4, and received rotatably and slidably in an annular space defined between the bearing portion 3 and the shaft 4, as shown in FIG. 2. As will be seen in FIG. 4, the stem portion 9 has a bottom end which is partly cut away to form an offset portion 24 radially inwardly offset from the outer peripheral surface of the stem portion. A slot or opening 16 is formed in the peripheral wall of the stem portion 9 above the offset portion 24. A slit-like elongated cut-out 26 is formed between the offset portion 24 and the slot 16 and open to the offset portion. A plurality of axial grooves 27 are formed in the periphery of the lower part of the stem portion 9.

Electric cords 13 connected at one ends to the antenna 12 extend through the grooves 32 and 33 in the shaft 4 into the cabinet 1 and are connected to the printed circuits on the board 5. A compression coil spring 14 extends between the bottom of the bearing portion 3 and a downwardly directed annular flange 20 formed on the inner peripheral surface of the stem portion 9 to always bias the antenna casing 8 outwardly of the recess 2.

A two-armed lever 15 having a projection 28 on one end is pivotally mounted at a substantially central portion by a pin 17 either on the cabinet 1 or the chassis adjacent the recess 2. The projection 28 is adapted to be engaged into the slot 16 in the stem portion 9 of the antenna casing 8 when the latter is pushed against the spring 14 down into the recess 2 so that the lever 15 prevents the casing 8 from being moved out of the recess 2 by the spring 14. The projection 28 is also adapted to be engaged with the offset portion 24 at the bottom of the stem portion 9 when the antenna casing 8 is lifted up by the spring 14. The lever 15 is provided with a through-hole or opening 36 formed in the other end of the lever. The opening 36 receives a coil spring 18 having intermediate or central convolutions 18a having a diameter larger than those of the convolutions 18b at the opposite end portions of the spring. The larger convolutions 18a of the spring 18 are in abutment contact with the peripheral edge portion 36a of the opening 36 so that the projection 28 of the lever 15 is resiliently biased toward the stem portion 9 of the antenna casing 8.

Figure 7:
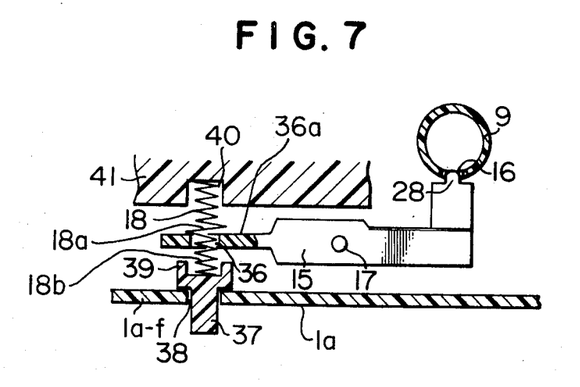
FIG. 7 illustrates partially in plan view and partially in horizontal section the stem portion and the operating lever.

As will be seen in FIG. 7, a lever actuation button 37 having a head portion extending through a through-hole 38 in the front face of the cabinet body 1a receives one end of the spring 18 in a recess defined by an annular skirt portion 39 of the button so that the button is always biased outwardly. The other end of the spring 18 is received in a recess 40 formed in a stationary part 41 which may be either a part of the cabinet 1 or a part of the chassis of the radio receiver.

Figure 8:
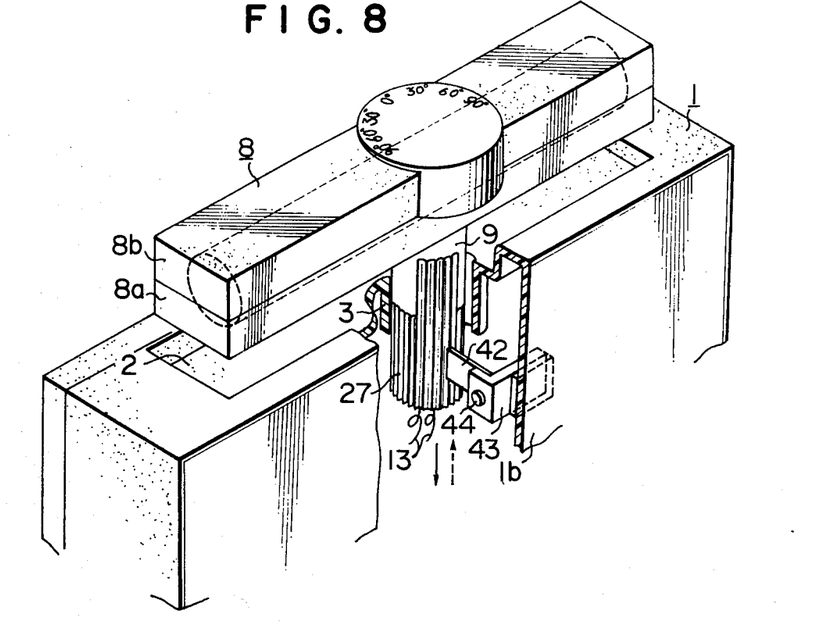
FIG. 8 is a perspective view of the receiver with parts cut away to show click sound producing mechanism.

Referring to FIG. 8, a resilient finger member 42 is mounted by a screw member 44 onto a fitting 43 fixed to the cabinet lid 1b and is so positioned as to be engaged into one of the grooves 27 in the stem portion 9 of the antenna casing 8 when the latter is sprung up from the recess 2 in the top of the cabinet 1.

Figure 9:
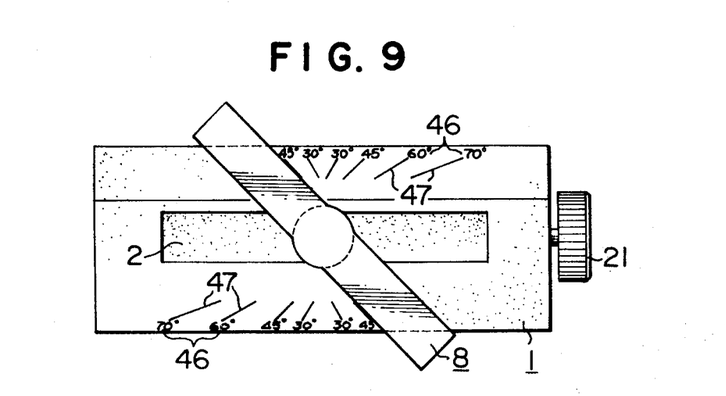
FIG. 9 is a plan view of the receiver showing rotation angle indicator provided on the top of the cabinet.
Figure 10:
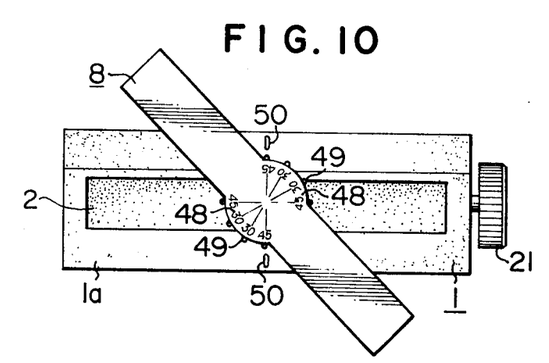
FIG. 10 is a view similar to FIG. 9 and illustrating a modification of the rotation angle indicator.

As shown in FIG. 9, there is provided on the top of the cabinet 1 an indicator in the form of numerals 46 representative of degree of rotation of the antenna and lines 47 extending from the numerals radially inwardly toward the axis of rotation of the antenna casing 8. Alternatively, the indicator may be provided on the antenna casing 8 in the form of similar numerals 48 and lines 49, as will be seen in FIGS. 4, 6, 8 and 10. In this case, a reference or "zero" position is indicated at 50 on the top of the cabinet 1.

Figure 1:
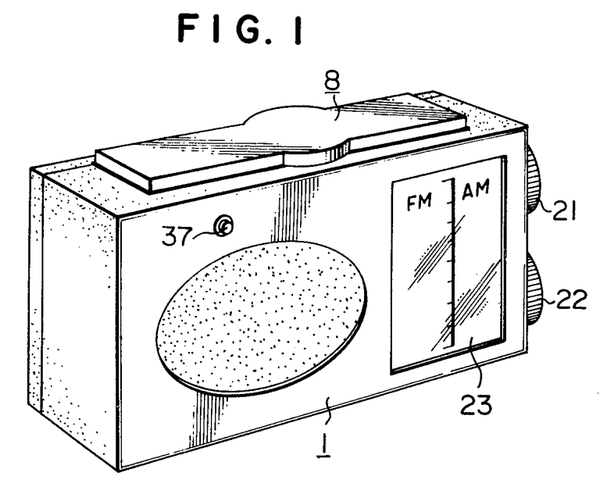
FIG. 1 is a perspective view of a radio receiver according to an embodiment of the present invention.
Figure 11:
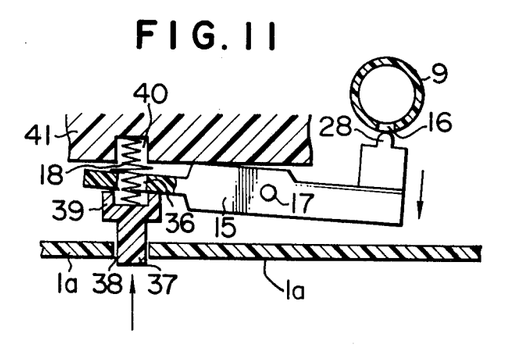
FIGS. 11 to 13 illustrate the positions of the operating lever, the stem portion of the antenna casing relative to the lever, and the antenna casing relative to the cabinet when the casing is moved out of a recess in the top of the cabinet.
Figure 12:
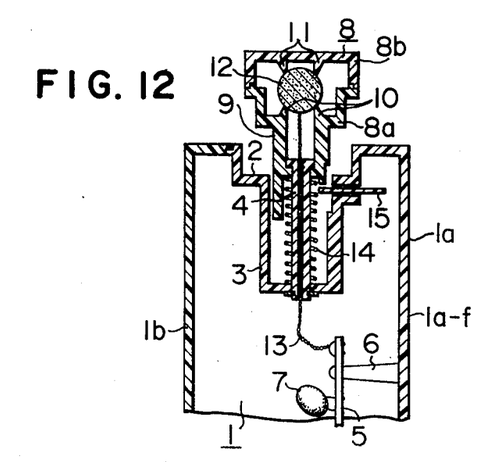
Figure 13:
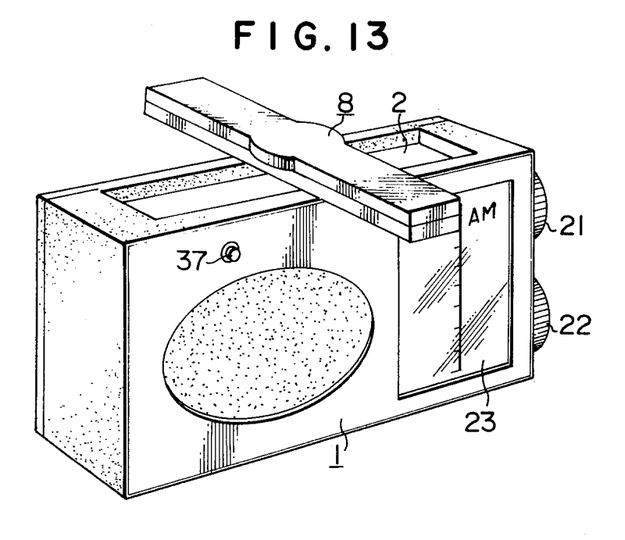

With the arrangement described, it is assumed that the antenna casing 8 is in its stowed position, as shown in FIG. 1, and the projection 28 on one end of the lever 15 extends into the slot 16 in the periphery of the stem portion 9 of the casing 8 to hold the same against upward movement by the spring 14. When the lever actuation button 37 is pushed as shown in FIG. 11 to move the other end of the lever 15 about the pin 17 against the spring 18, the projection 28 on the one end of the lever 15 is moved out of engagement with the slot 16 to allow the stem portion 9 of the antenna casing 8 to be pushed up by the spring 14 with a result that the casing 8 is moved out of the recess 2, as shown in FIG. 12. If the pressure on the button 37 is removed therefrom, the larger convolutions 18a of the spring 18 will be urged by the spring force against the other end of the lever 15 to rotate the same in a counterclockwise direction as viewed in FIG. 11 so that the button 37 is pushed back to its initial position shown in FIG. 7 and is resiliently held in this position by the spring 18. At the same time, the projection 28 on the one end of the lever 15 is moved into engagement with the offset portion 24 at the bottom of the stem portion 9 of the antenna casing 8, as shown in FIG. 12. In this position, the antenna casing 8 can be rotated about the axis of the stem portion 9 over an angle which is determined by the angles over which the offset portion 24 and projection 28 angularly extend about the axis of the stem portion 9 of the antenna casing 8. Thus, the antenna casing 8 and thus the antenna 12 therein may be rotated to any desired orientation, as shown in FIG. 13, so that a desired radio wave is caught best. In addition, when the antenna casing 8 is rotated, click sounds are produced by the resilient finger 42 as the same is moved over the grooves 27 one after another against the resiliency of the finger. The sounds enable an operator to realize the rotation of the antenna 12.

Figure 14:
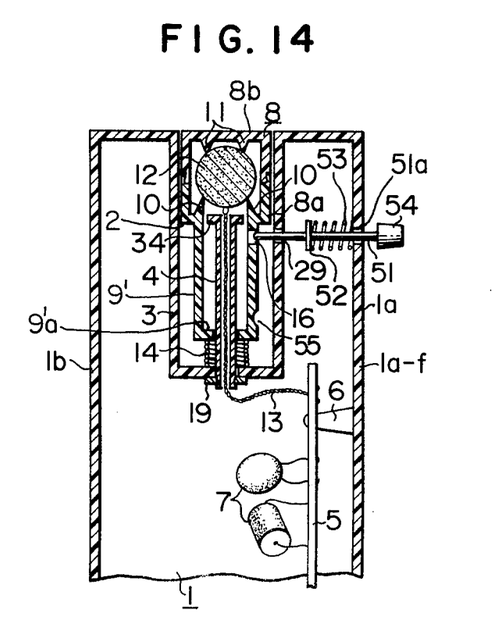
FIG. 14 is a view similar to FIG. 2 and illustrates another embodiment of the present invention.
Figure 15:
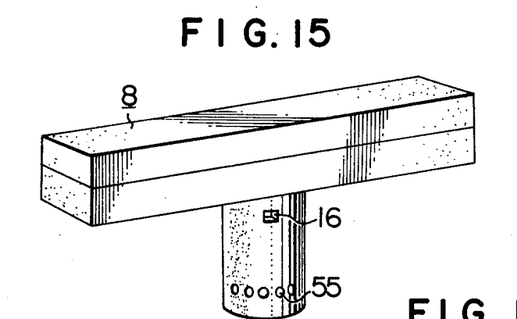
FIGS. 15 and 16 are perspective views of antenna casing of the other embodiment.
Figure 16:
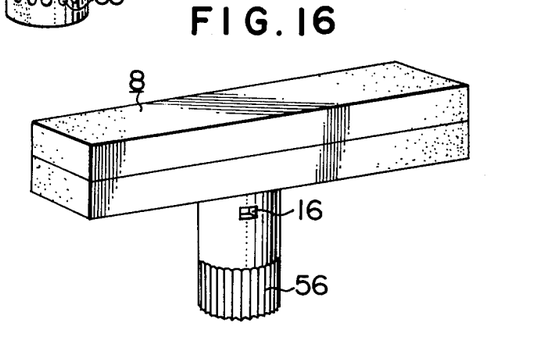
Figure 17:
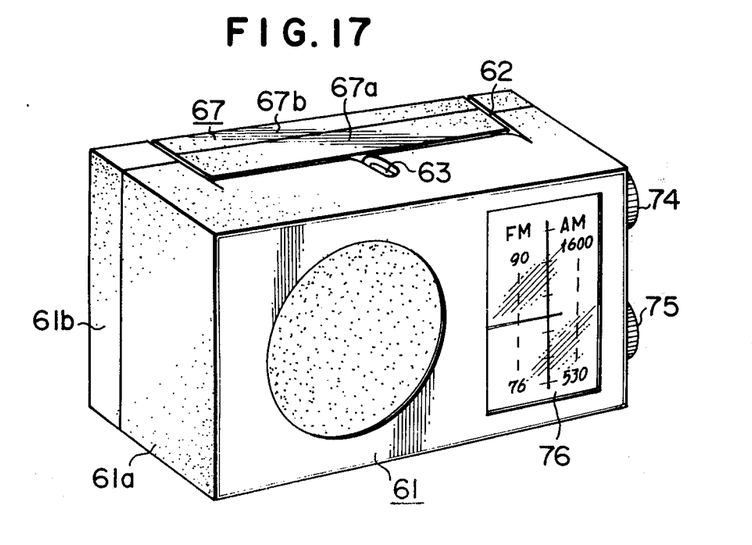
FIGS. 17 to 20 illustrate a further embodiment of the invention.

FIGS. 14 to 16 illustrate another embodiment of the present invention. Similar parts and members are indicated by similar reference numerals in these figures. The embodiment is substantially similar to the first embodiment described except the feature that a rod member 51 axially slidably extends through a hole 51a in the front wall 1a-f of a cabinet body 1a and through another hole 29 in the adjacent wall of a bearing portion 3 of a cabinet 1. The rod member 51 has a spring retainer part 52 in the form of a flange or a projection formed on the rod member intermediate the ends thereof. A compression spring 53 extends around the rod member 51 between the spring retainer part 52 and the front wall 1a-f of the cabinet body 1a to bias the rod member inwardly toward a tubular stem portion 9 of an antenna casing 8. The rod member 51 has its inner end extending into a through-hole 16 formed in the peripheral wall of the stem portion 9 of the antenna casing 8 when the same is in its stowed position shown in FIG. 14. Thus, the antenna casing 8 is prevented from being sprung up by a compression spring 14 extending between the bottoms of the stem portion 9' of the antenna casing 8 and a recess 2 in the top of the cabinet 1.

When an operating knob 54 secured to the outer end of the rod member 51 is moved to pull the rod member outwardly against the spring 53, the inner end of the rod member is moved out of the through-hole 16 in the stem portion 9 of the antenna casing 8 to allow the same to be lifted out of the recess 2 by the compression spring 14 until the bottom 9'a of the stem portion 9' is engaged by a flange 34 formed on the top of a shaft 4 so that the antenna casing 8 is prevented from being further moved upwardly by the spring 14 and is held in the lifted position. Thus, the antenna casing 8 can be rotated about the axis of the shaft 4 to an orientation in which the radio receiver catches a desired radio wave best.

Advantageously, a plurality of recesses 55 are formed in the periphery of the stem portion 9' adjacent the bottom end thereof, as will be seen in FIG. 15, so that the inner end of the rod member 51 cooperates with any one of these recesses to cause regulated rotation of the antenna casing 8. Alternatively, the stem portion 9' of the antenna casing may be formed with a plurality of axial grooves 56, as shown in FIG. 16.

Figures 18, 19, 20:
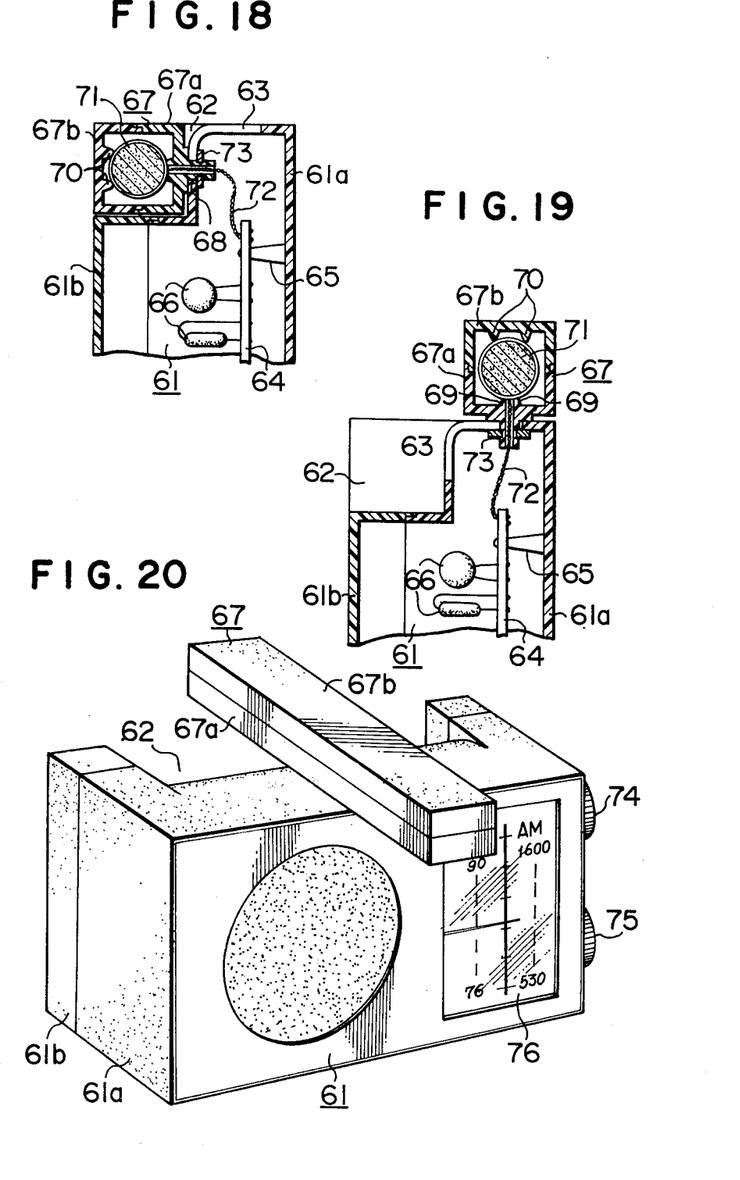

FIGS. 17 to 20 illustrate a further embodiment of the radio receiver according to the present invention. The radio receiver of the embodiment has a cabinet 61 formed by a cabinet body 61a and a cabinet lid 61b fitted thereto. The cabinet 61 carries tuning and volume controller knobs 74 and 75 mounted on one side face of the cabinet, while a dial 76 is provided on the front face of the cabinet. A recess 62 is formed in the rearward area of the top of the cabinet 61. As shown in FIG. 18, the part of the top of the cabinet 61 between the front wall thereof and the recess is connected to one vartical wall of the recess 62 by a curved wall portion. A slot 63 is formed in the top and the vertical wall of the cabinet 61 and extends transversely of the cabinet 61, as will be seen in FIGS. 18 and 19. A board 64 carrying printed circuits thereon is secured to the cabinet body 61a by means of a boss 65 formed on the inner surface of the front wall of the cabinet body 61a. The board 64 also carries thereon electric components forming electric circuits of the radio receiver, some of the electric components being shown and indicated by 66.

An antenna casing 67 having a tubular stem portion 68 slidably and rotatably extending through the slot 63 into the cabinet 61 is formed by a pair of casing parts 67a and 67b secured to each other. The stem portion 68 is mounted on the cabinet 61 by a fastener 73 against removal from the slot 63. The casing parts have ribs 69 and 70 which are formed on the inner surfaces of the casing parts and which cooperate to hold within the casing 67 a rod-like antenna which is preferably a ferite antenna 71. Electric cords 72 having one ends connected to the antenna 71 extend through a throughhole in the stem portion 68 of the antenna casing 67 into the cabinet 61 and are connected to the electric circuits on the printed circuit board 64.

The stem portion 68 of the cabinet casing 67 may be moved along the slot 63 from the horizontal position shown in FIG. 18 to the vertical position shown in FIG. 19 in which the antenna casing 68 rests on the top of the cabinet casing and can be rotated about the axis of the stem portion 68 to an orientation in which the antenna 71 can catch a desired radio wave best.

What we claim is:

1. A radio receiver, comprising:
   a cabinet having a chassis mounted therein on which radio receiving electric circuit components are disposed;
   a recess formed in a top portion of said cabinet and having a tubular bearing portion extending inwardly of said cabinet from said recess;
   a casing having a rod-like antenna housed therein;
   an elongated stem portion fixed to and extending from said antenna casing into said bearing portion, said stem portion having at least one opening in a peripheral surface thereof and a portion which is radially offset from said peripheral surface;
   means supporting said stem portion in said bearing portion for rotational movement within said bearing portion and for movement between axially extended and axially retracted positions relative to said bearing portion, said stem portion support means including a shaft member secured at one end to said bearing portion and extending into said stem portion to interconnect said bearing and stem portions and to limit the range of axial movement of said stem portion relative to said bearing portion, and a spring member extending between said bearing and stem portions and biasing said antenna casing outwardly of said recess; and
   an operating member movably mounted on said cabinet and having one end portion biased toward said stem portion for engagement with said opening in said stem portion in said axially retracted position and for engagement with said radially offset portion in said axially extended position to limit the amount of rotation of said stem portion with respect to said bearing portion.

2. A radio receiver according to claim 1, in which said antenna is connected to said circuits by an electric conductor, and said shaft member defines therein axial passage means through which said conductor extends.

3. A radio receiver according to claim 1, in which said operating member comprises a lever member pivotally mounted on said cabinet and having an end disposed adjacent said stem portion of said antenna casing, the other end of said lever member being disposed adjacent an outer surface of said cabinet.

4. A radio receiver according to claim 3, in which said lever member defines therein an opening and is resiliently supported by a coil spring member extending through said opening in said lever member, said coil spring member having at least one convolution greater in diameter than the remaining convolutions of said coil spring member, the convolution having the greater diameter being engageable with said lever member around said opening therein.

5. A radio receiver according to claim 1, in which a dial is provided on the top of said cabinet for indicating the angle of rotation of said antenna casing relative to said cabinet.

6. A radio receiver according to claim 1, in which said antenna casing has side faces having means formed thereon for indicating the angle of rotation of antenna casing relative to said cabinet, and the top of said cabinet has means for indicating a reference point cooperative with said angle indicating means.

7. A radio receiver according to claim 1, further comprising: a plurality of axial grooves formed on an outer peripheral surface of said stem portion; and a resilient member mounted to said cabinet and having one end extending into engagement with one of said stem portion axial grooves in said axially extended position, said antenna casing being rotatable about the axis of said stem portion against the force applied by said resilient member.

8. A radio receiver, comprising:
   a cabinet having a chassis mounted therein on which radio receiving electric circuit components are disposed;
   a recess formed in a top portion of said cabinet and having a tubular bearing portion extending inwardly of said cabinet from said recess;
   a casing having a rod-like antenna housed therein, said casing having an elongated stem portion extending into said bearing portion, said stem portion having a plurality of axial grooves formed on an outer peripheral surface thereof;
   means supporting said stem portion in said bearing portion for rotational and axial movement relative to said bearing portion, said stem portion and said antenna casing being movable between axially extended and axially retracted positions; and
   a resilient member mounted to said cabinet and having one end extending into engagement with one of said stem portion axial grooves in said axially extended position of said stem portion, said antenna casing being rotatable about the axis of said stem portion against the force applied by said resilient member.

* * * * *